United States Patent [19]
Briggs

[11] Patent Number: 5,527,071
[45] Date of Patent: Jun. 18, 1996

[54] PROTECTIVE COLLAR FOR HOSE CONNECTIONS

[75] Inventor: Norman B. Briggs, Corcoran, Minn.

[73] Assignee: Norge Custom Products, Inc., Chanhassen, Minn.

[21] Appl. No.: 339,774

[22] Filed: Nov. 15, 1994

[51] Int. Cl.⁶ ..................................................... F16L 11/14
[52] U.S. Cl. ........................... 285/45; 285/419; 285/423
[58] Field of Search ............................. 285/38, 315, 316, 285/45, 419, 423

[56]     References Cited

U.S. PATENT DOCUMENTS

| | | |
|---|---|---|
| 3,367,358 | 2/1968 | Rentschler . |
| 4,741,559 | 5/1988 | Berghman ................................. 285/45 |
| 4,750,762 | 6/1988 | Corrine . |
| 4,792,162 | 12/1988 | Medrick ............................ 285/316 X |
| 4,930,543 | 6/1990 | Zuiches . |
| 5,002,314 | 3/1991 | Smith . |
| 5,127,678 | 7/1992 | Henning . |

*Primary Examiner*—Dave W. Arola
*Attorney, Agent, or Firm*—Palmatier, Sjoquist & Helget; Nelson R. Capes

[57]     ABSTRACT

A protective collar for hose connections consists of a hard clamping ring or collar comprised of two semicircular segments in the shape of a disk, the segments mating together. The center opening of the disk clamps onto the ferrules of one or both connecting hoses. The segments are held together by screws or bolts and nuts which pass through internal bores in the segments. The protective collar is of a greater outside diameter than the ferrules so that the protector, And not the ferrules, will absorb any impact from being stepped on, dropped on the floor, or pinned beneath a heavy object.

14 Claims, 3 Drawing Sheets

PROTECTIVE COLLAR FOR HOSE CONNECTIONS

BACKGROUND OF THE INVENTION

In the pharmaceutical, dairy, food, cosmetic, and chemical industries, fluids must be transported between storage tanks, processing vessels and other points of use. Typically, the fluids are pumped through hoses with a number of them connected together along the path of transport.

In sanitary environments, the hoses usually have ferruled ends that are clamped together. These fittings are easily cleaned and are deemed sanitary fittings.

The ferrule ends are susceptible to damage when dropped on hard floors, such as concrete, quarry tile or epoxy finishes. The ends get nicked and abraded and in time must be replaced. The floor is also damaged when the metal ferrules hit the floor. The chipped flooring detracts from the appearance of the area and may require expensive repair.

In a sanitary environment, when the end of the hose contacts the floor, it becomes unsanitary and must be recleaned before making the connection with another sanitized fitting.

Furthermore, the damaged metal ferrules may cut a person's fingers who is connecting the ferrules together.

There is a need for a removable, protective collar for hose connections that prevents the hose connections from being damaged when dropped on the floor. The protective collar must also keep the hose connection off the floor or ground for cleanliness and sanitization. The protective collar must also be resistant to corrosive fluids and should not spark when struck, to prevent fires and explosions from flammable fluids. The protective collar also aids in assembling fittings by allowing workers to grasp the hose behind the collar like the hilt on a sword.

SUMMARY OF THE INVENTION

A protective collar for hose connections consists of a hard clamping ring or collar comprised of two semicircular segments in the shape of a disk, the segments mating together. The center opening of the disk clamps onto the ferrules of one or both connecting hoses. The segments are held together by screws or bolts and nuts which pass through internal bores in the segments. The protective collar is of a greater outside diameter than the ferrules so that the protector, and not the ferrules, will absorb any impact from being dropped on the floor.

A principal object and advantage of the invention is that it provides a protective collar for hose connections that prevents damage to the connections due to their being dropped on the floor.

Another object and advantage of the invention is that it keeps the hose connections off the floor, thus avoiding contamination by dirt and other foreign materials.

Another object and advantage of the invention is that it aids in connecting the ferrules together by providing a handle which can be used to grasp the connectors.

Another object and advantage of the invention is that the protective collar stays with the hose connection when the hoses are separated, thus providing damage protection in the separated as well as in the joined state.

Another object and advantage of the invention is that it easily removable without special tools and without damage to the hose connections.

Another object and advantage of the invention is that is constructed of a hard material which resists chemicals used in sanitization of hoses and connectors, thus making it very applicable to pharmaceutical, food and dairy, and medical applications. The hard material also resists corrosion by corrosive liquids.

Another object and advantage of the invention is that it will not spark when struck, thus making it usable in environments where there are flammable fluids.

Another object and advantage of the invention is that its smooth, substantially circular outer surface permits the hoses to be dragged across the floor, if necessary, with minimal friction.

DETAILED DESCRIPTION OF THE PREFERRED EMBODIMENTS

Figure 1:
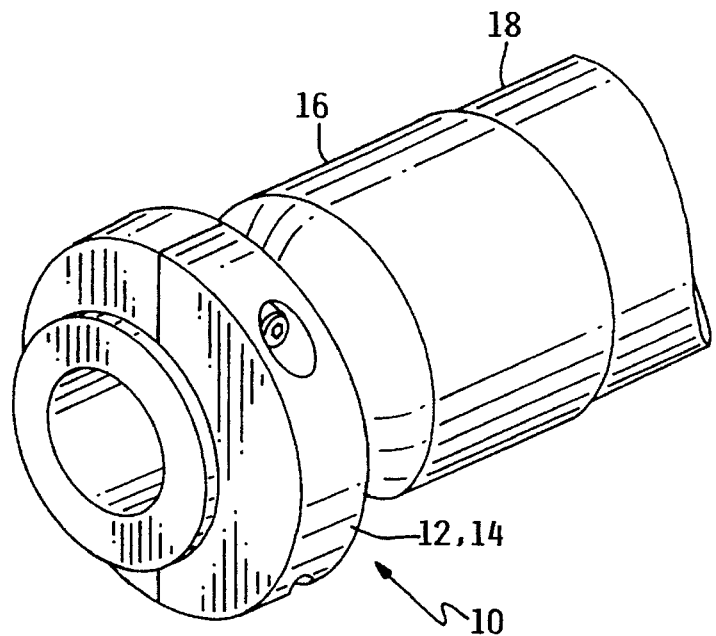
FIG. 1 is a perspective view of the protective collar in place on the ferrule connector of a hose.
Figure 2:
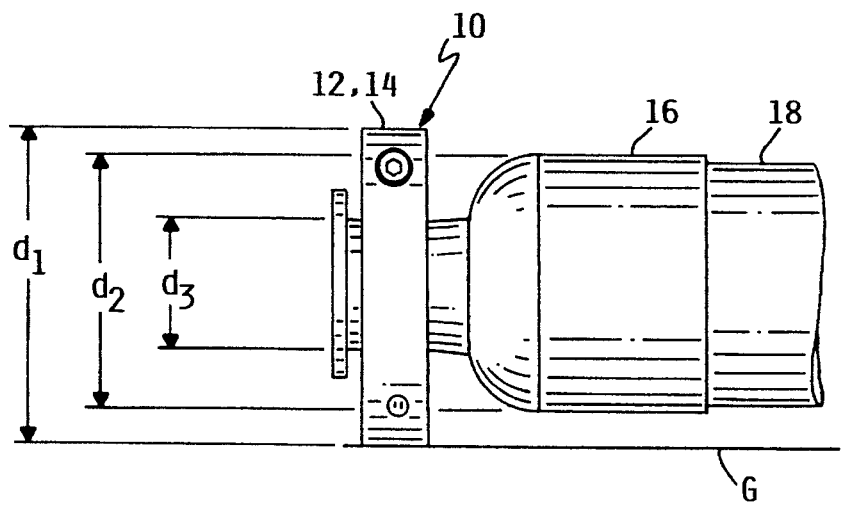
FIG. 2 is a side elevational view of the protective collar in place on the ferrule connector of a hose.

The protective collar of the present invention is shown in FIGS. 1–5 by the reference numeral 10.

The protective collar 10 comprises a disk 12 with a substantially circular outer periphery 14 having a diameter $d_1$ greater than the diameter $d_2$ of a hose connection or ferrule 16 on a hose 18. The protective collar 10 may also protect a ferrule 20 which mates with the ferrule 16.

The disk 12 has a central substantially circular bore 22 of a diameter substantially the same as the diameter $d_3$ of the narrow part of the ferrule 16, such that the bore 22 engages the ferrule 16 with little or no space between the ferrule 16 and the disk 12.

Figure 3:
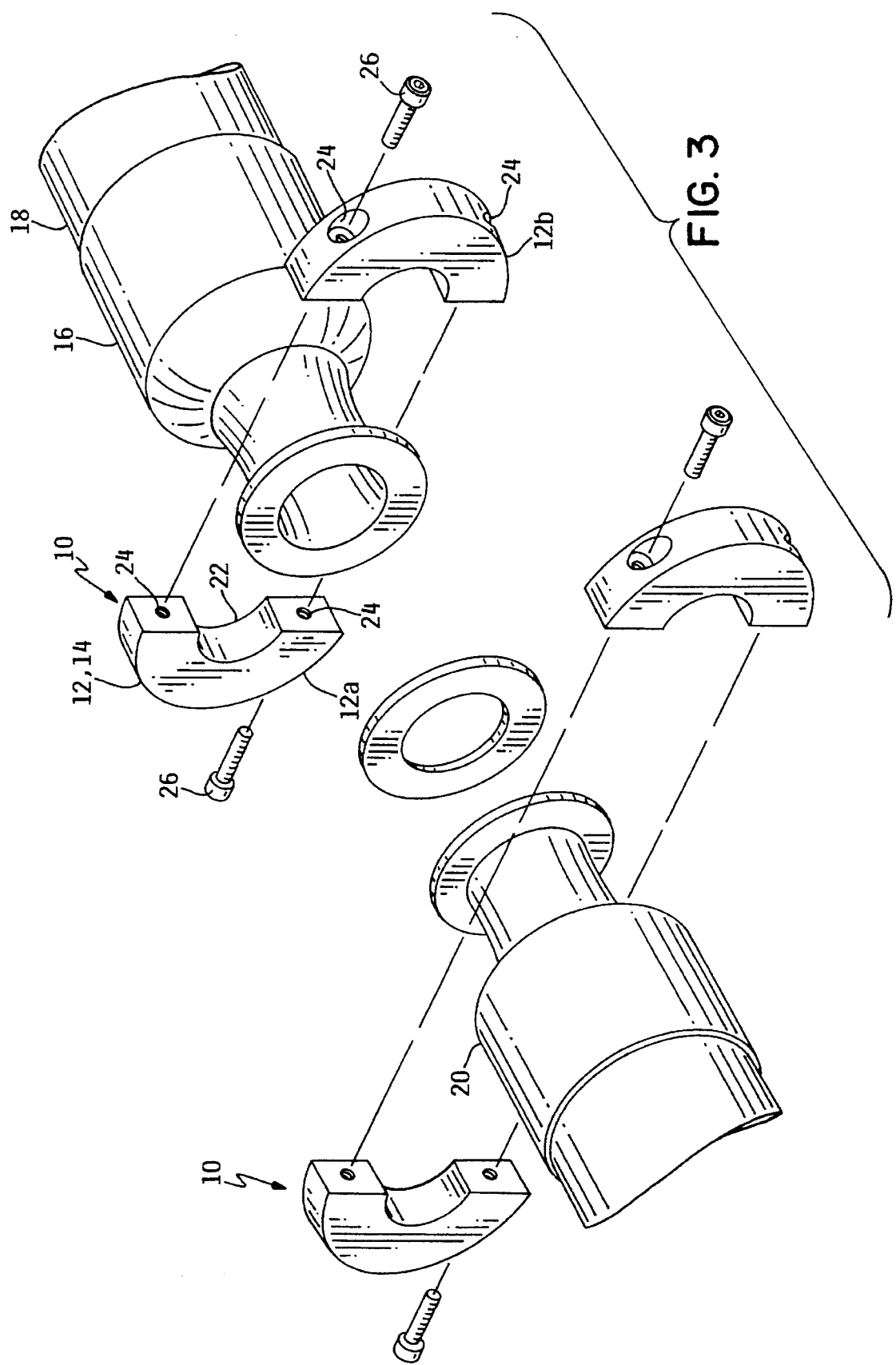
FIG. 3 is an exploded view of the protective collar, showing how the collar is clamped onto the ferrule connectors of a hose.

As can be seen best in FIG. 3, the disk 12 is axially split into mirror-image halves, 12a and 12b. The halves 12a and 12b clamp together around the ferrule 16 to securely engage the ferrule 16 within the bore 22.

Figure 4:
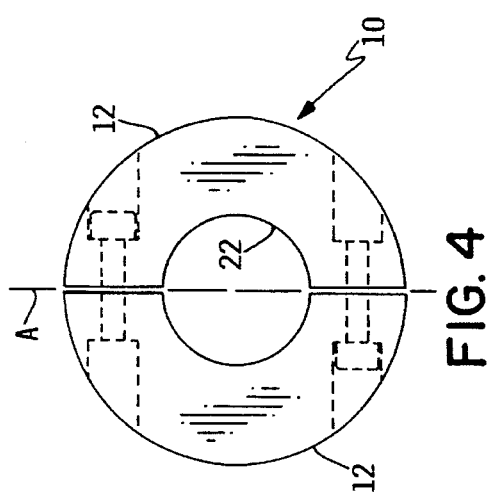
FIG. 4 is a front elevational view of the protective collar, with some internal detail shown by phantom lines.

One or more holes 24 are bored through the disk 12, so that the axes of the holes 24 transverse the axis A of the disk 12, as shown in FIG. 4.

One or more fasteners 26 sized to fit into the holes 24 are inserted therein, thereby joining the halves 12a and 12b securely together. The diameter of the central bore 22 is substantially the same as the minimum diameter $d_3$ of the ferrule 16, thus securely engaging the ferrule 16 within the bore 22.

It will be seen that because the diameter $d_1$ of the disk 12 is greater than the maximum diameter $d_2$ of the ferrule 16, the substantially circular outer periphery 14 of the disk 12 will preferentially contact the ground or floor G, rather than the ferrule 16 contacting the ground or floor. In this manner, the ferrule 16 is prevented from being contaminated by dirt or other foreign objects.

Also, because the diameter $d_1$ is greater than the diameter $d_2$, the disk 12, not the ferrule 16, will contact the floor G when dropped, thus preventing damage to ferrule 16.

Furthermore, the disk 12 is made of a hard material which completely resists deformation when stepped on or pressed beneath a heavy object while the disk 12 is in contact with the floor or ground G. The collar 10 thus protects the ferrule 16 from being crushed.

In the preferred embodiment, the disk 12 is constructed of a hard plastic such as UHM-W, polycarbonate, or polyethylene. The ideal plastic will be non-deformable under heavy loads, will have a melting point greater than 100 degrees Centigrade so as to resist sanitization, will be resistant to the action of corrosive chemicals, and will not spark when struck. The collar 10 may thus be used in pharmaceutical and medical applications which require sterilization and will be usable in the presence or corrosive or flammable liquids or vapors. The disk may also be constructed of a hard, silicone rubber such as General Electric RTV.

It will be seen that, if a collar 10 is clamped to both the ferrule 16 and the ferrule 20, the hose connection between the ferrules is completely protected against damage due to being dropped. Furthermore, the ferrules may be separated and still be protected.

Figure 5:
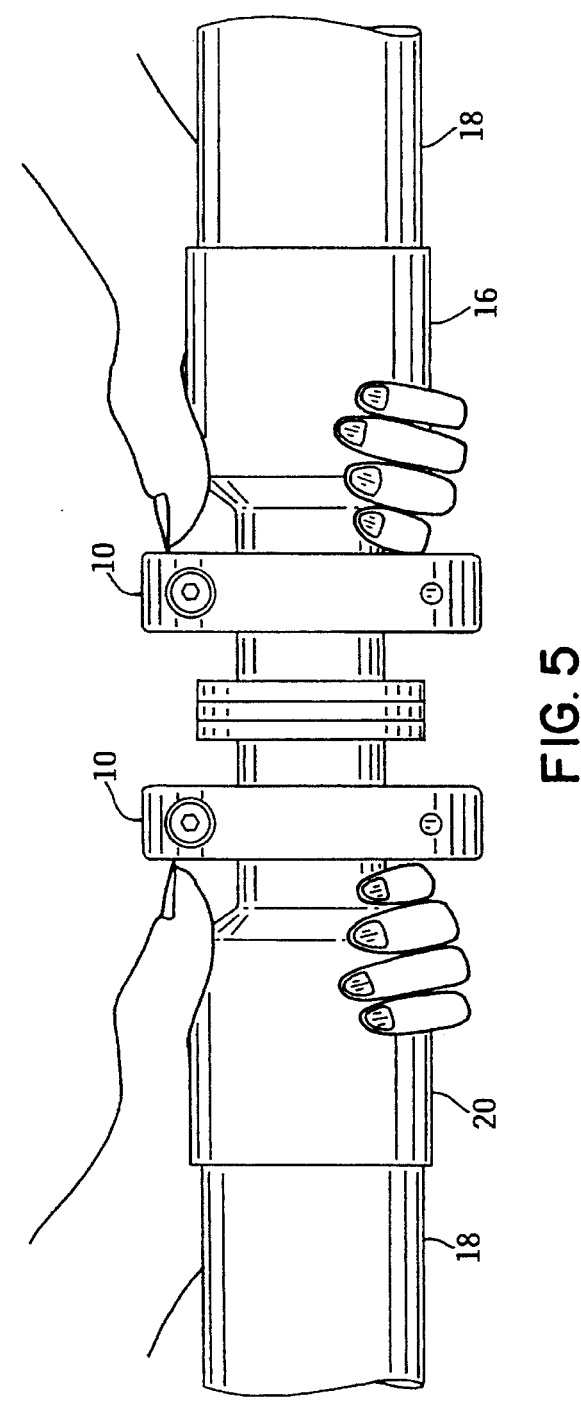
FIG. 5 is a side elevational view of the protective collar in place on the ferrule connectors of two hoses, showing use of the collar as a handle for making the hoses together.

It will also be seen in FIG. 5 that the collar 10 aids in assembly of the heavy, bulky ferrules by allowing a worker to grasp the ferrules 16, 20 behind the collar 10, thereby using the collar 10 as a handle.

It will also be seen that the collar 10 is easily removable without special tools and without damage to the ferrules.

It will also be seen that the smooth, substantially circular periphery 14 of the disk allows the hose 18 to be dragged across a floor while little friction results between the collar 10 and the floor G.

The fasteners 26 may either be screws, threaded into the holes 24, or bolts and nuts. In the preferred embodiment, the fasteners are inserted into the holes from opposite directions, thereby providing a very secure fit between the ferrule 16 and the disk 12.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A removable, re-usable protective collar separately attachable to each of two mating hose connections or ferrules for preventing damage to hose connections or ferrules whether the hose connections or ferrules are connected together or unconnected, comprising:

a disk with a smooth, substantially circular outer periphery of a diameter greater than the maximum diameter of the hose connection (ferrule), said disk having a central substantially circular bore of a diameter substantially the same as the minimum diameter of the hose connection (ferrule), said disk being axially split into two mirror-image halves, said disk also having holes whose axes lie transverse to the axis of said circular bore, and fasteners sized to fit into said holes, thereby joining said mirror-image halves securely together, said mirror-image halves being joined together by said fasteners thus securely engaging the hose connection (ferrule) within said central bore, such that the hose connection (ferrule) is kept off the floor or ground by said disk and protected from being damaged by being dropped on the floor whether the hose connections or ferrules are connected together or unconnected and such that the hose connections or ferrules may be disconnected without removing said protective collar.

2. The protective collar of claim 1, wherein said disk is constructed of a hard material, thereby resisting the weight of the hoses and ferrules when dropped on the floor.

3. The protective collar of claim 2, wherein said disk is constructed of a material which does not spark when struck by a metal object.

4. The protective collar of claim 2, wherein said disk is constructed of plastic.

5. The protective collar of claim 4, wherein said disk is constructed of plastic with a melting point greater than 100 degrees centigrade, thereby resisting deformation during sanitization.

6. The protective collar of claim 4, wherein said disk is constructed of plastic which is resistant to corrosive chemicals.

7. The protective collar of claim 1, wherein said disk is constructed of silicone rubber.

8. The protective collar of claim 1, wherein said fasteners further comprise screws and wherein said holes are threaded to accept said screws.

9. The protective collar of claim 1, wherein said fasteners further comprise bolts and nuts.

10. The protective collar of claim 1, wherein said fasteners are inserted into said holes from opposite directions.

11. A removable, re-usable protective collar separately attachable to each of two mating hose connections or ferrules for preventing damage to hose connections or ferrules whether the hose connections or ferrules are connected together or unconnected, comprising:

a disk, axially split into two mirror-image halves, said disk having a substantially circular outer periphery of a diameter greater than the maximum diameter of the hose connection (ferrule), said disk having a central substantially circular bore of a diameter substantially the same as the minimum diameter of the hose connection (ferrule), said disk being constructed of a hard, nondeformable, thermally-resistant and corrosion-resistant material, said disk also having holes whose axes lie transverse to the axis of said circular bore, and fasteners sized to fit into said holes, thereby joining said mirror-image halves securely together, said mirror-image halves being joined together by said fasteners thus securely engaging the hose connection (ferrule) within said central bore such that the hose connection (ferrule) is kept off the floor or ground by said disk and protected from being damaged by being dropped on the floor whether the hose connections or ferrules are connected together or unconnected and such that the hose connections or ferrules may be disconnected without removing said protective collar.

12. The protective collar of claim 11, wherein said fasteners further comprise screws and where said holes are threaded to accept said screws.

13. The protective collar of claim 11, wherein said fasteners further comprise bolts and nuts.

14. The protective collar of claim 11, wherein said fasteners are inserted into said holes from opposite directions.

* * * * *